July 23, 1963 F. X. MARSH 3,098,357
GAS TURBINE ENGINE CONSTRUCTION
Filed Jan. 26, 1959 2 Sheets-Sheet 1

INVENTOR.
FRANCIS X. MARSH
BY
*Hauke & Hardee*
ATTORNEYS

July 23, 1963 F. X. MARSH 3,098,357
GAS TURBINE ENGINE CONSTRUCTION
Filed Jan. 26, 1959 2 Sheets-Sheet 2
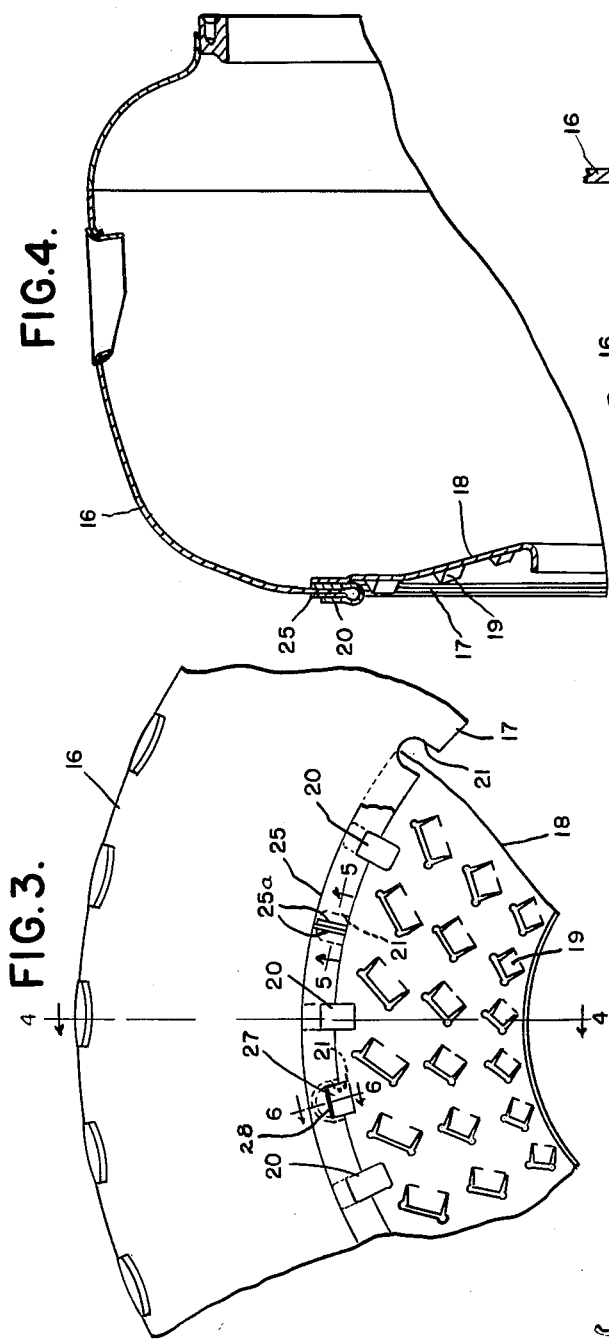
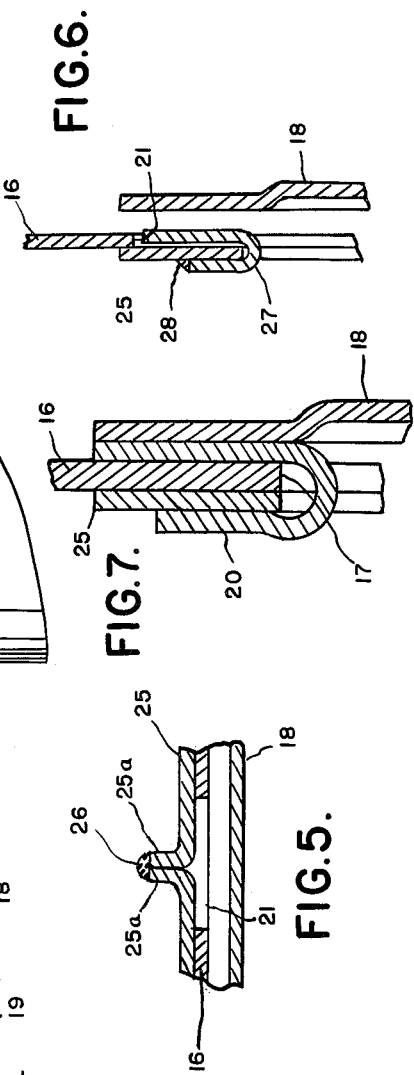
INVENTOR.
FRANCIS X. MARSH
BY
Hanke & Hardesty
ATTORNEYS 3,098,357
Patented July 23, 1963

3,098,357
GAS TURBINE ENGINE CONSTRUCTION
Francis X. Marsh, Grosse Pointe Woods, Mich., assignor to Continental Aviation and Engineering Corporation, Detroit, Mich., a corporation of Virginia
Filed Jan. 26, 1959, Ser. No. 788,829
2 Claims. (Cl. 60—39.31)

This invention relates to gas turbine engine construction and more particularly to an improved combustion chamber housing structure.

In a combustion chamber housing comprising a combustor structure subject to the high temperature of combustion and a swirl vane structure subject to the relatively lower temperatures of inlet air, the attachment of the structures must be such as will permit relative expansion and contraction thereof.

Heretofore, such assemblies have been made inseparable, and considerable time is required both in assembling the structure and in making necessary repairs and replacements, as when the combustor has been damaged. Generally, re-use of undamaged parts has not been feasible heretofore, and cost of replacement is high.

An object of the present invention is to improve the construction of gas turbine engines by providing an improved combustion chamber housing assembly.

Another object of the invention is to simplify assembly of gas turbine engine combustion chamber housing by providing an improved means for attaching a combustor structure and a swirl vane structure.

Yet another object of the invention is to facilitate repair of gas turbine engine combustion chamber housing structures by constructing a readily disassembled combustor and swirl vane.

A further object of the invention is to improve gas turbine engine combustion chamber housing structures by providing relatively movable assembled combustor and swirl vane structures.

Still a further object of the invention is to provide for relative thermal expansion and contraction of assembled combustion chamber housing components by utilizing a simplified attaching means.

For a more complete understanding of the invention, reference may be had to the accompanying drawings illustrating a preferred embodiment of the invention in which like reference characters refer to like parts throughout the several views and in which FIG. 1 illustrates a partially sectioned diagrammatic view of a preferred gas turbine engine having a combustion chamber outer housing embodying the present invention.

FIG. 3 is a fragmentary elevational view of the housing of FIG. 2.

FIG. 4 is a cross-sectional view taken substantially on the line 4—4 of FIG. 3.

FIG. 5 is a cross-sectional detail taken substantially on the line 5—5 of FIG. 3.

FIG. 6 is a cross-sectional detail taken substantially on the line 6—6 of FIG. 3, and FIG. 7 is an enlarged fragmentary cross-sectional detail of the attaching means as seen in FIG. 4.

Figure 1:
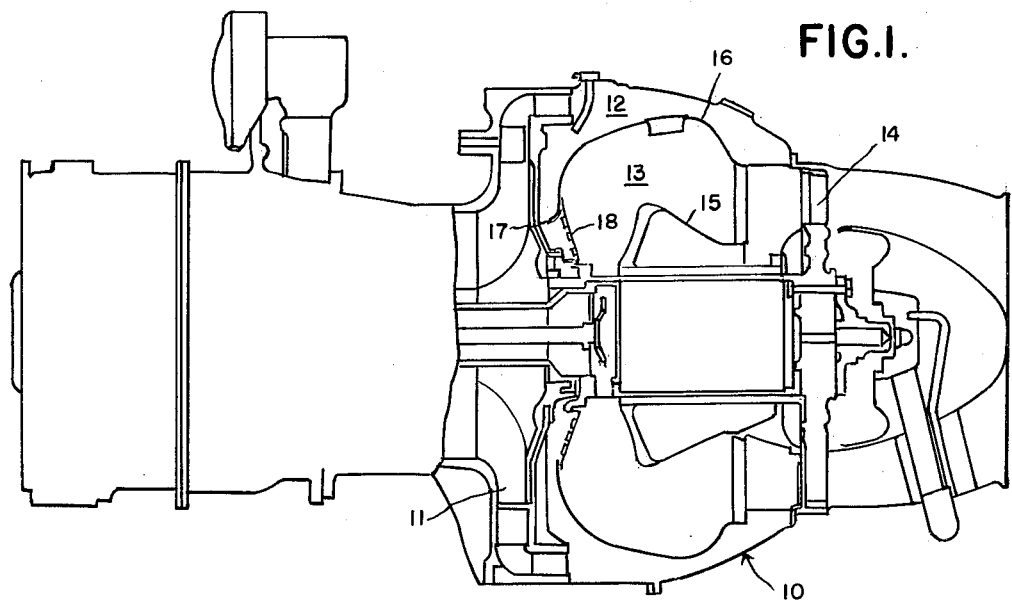
Figure 2:
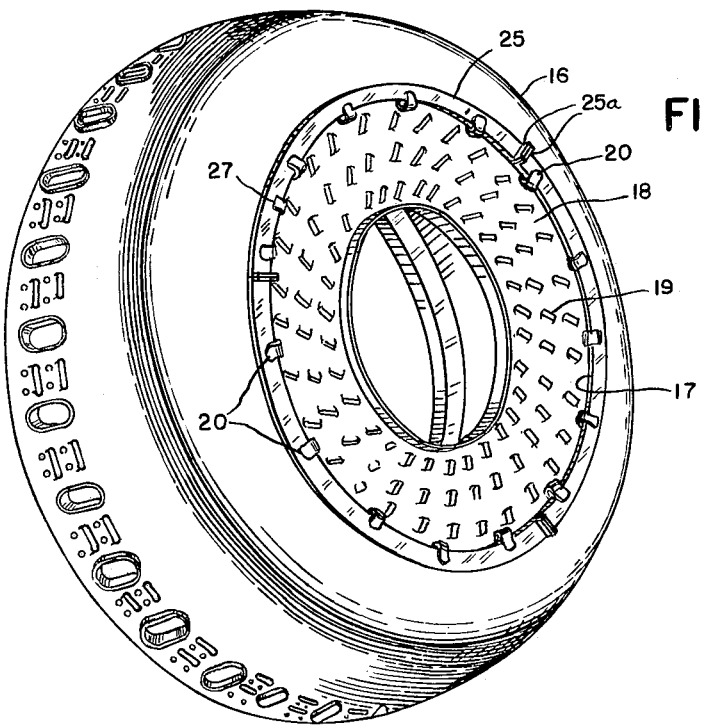
FIG. 2 is a perspective view of the combustion chamber outer housing of FIG. 1.

In FIG. 1, a preferred gas turbine engine 10 is illustrated diagrammatically as having a compressor 11, an annular compressed air reservoir 12, an annular combustion chamber 13, and a turbine 14. The combustion chamber 13 is preferably enclosed by a housing comprising an annular inner combustor structure 15, an annular outer combustor structure 16 having a central opening 17, and a swirl vane structure 18 adapted to cover the opening 17. The outer combustor structure 16 and the swirl vane structure 18 provide the housing assembly as illustrated in FIG. 2.

The swirl vane structure has a plurality of vanes 19 as shown for admitting air from the reservoir 12, and it will be apparent that since the combustor structure 16 is subject to the higher temperatures of combustion gas there will be relative radial movement of the combustor structure 16 and the swirl vane structure 18, so that a rigid attachment between the structures is impossible. The present means for structurally attaching the swirl vane structure 18 and the outer combustor structure is illustrated more fully in FIGS. 2 to 7 as follows:

A plurality of circumferentially spaced substantially U-shaped clips 20 are mounted along the outer peripheral edge of the swirl vane structure 18 as shown in FIG. 7, with the legs of the clips extending radially outwardly. The swirl vane structure 18 is larger than the combustor structure opening 17, the edge of which is provided with a plurality of scallops or notches 21 circumferentially spaced the same as the circumferentially spacing of the clips 20. Thus, in assembling the structures, the legs of the clips not secured to the swirl vane structure 18 can be inserted through the notches 21 and the swirl vane structure 18 rotated to engage the portions of the combustor structure opening edge between the notches 21 with the clips 20, as illustrated in FIGS. 3, 4 and 7.

It is desirable in the present housing assembly to space the swirl vane structure 18 axially from the combustor structure 16, providing an air passage, and this spacing function is performed by the inner legs of the clips 20, the edge of the combustor structure opening 17 being disposed between the legs of the clips 20 as shown.

For retaining the structures in assembly, a segmented ring element 25 is inserted between the outer legs of the clips 20 and the combustor structure 16 adjacent the opening 17. The clips 20 are preferably made of a resilient material to provide for positive clamping of the ring element 25 to the combustor structure 16. Each segment of the ring element 25 has turned-up ends 25a as shown in FIG. 5 which are then welded as at 26.

A U-shaped tab 27 is inserted around the inside edge of the ring element 25, engaging in one of the notches 21 as illustrated in FIG. 6, the tab 27 being welded as at 28 to the ring element 25, thus preventing displacement of the ring element 25 with respect to the combustor structure 16. The ring element 25 when assembled closes the notches 21 to prevent the swirl vane structure 18 from becoming disconnected from the combustor structure 16.

It will be seen that this means of attachment permits relative thermal expansion and contraction of the combustor structure 16 and the swirl vane 18, the edge of the combustor structure opening 17 being spaced from the bases of the clips 20 to allow for relative radial motion.

Disassembly of the structures when constructed in the present manner is a relatively simple operation and causes little scrapping of material. All that is necessary is to grind off the weld 26 joining the retainer ring segments and the weld 28 holding the tab 27 to the retainer ring 25. The retainer ring 25 can then be removed radially outward from the clips 20, opening the notches 21 for removal of the clips therethrough.

Although I have described only one preferred embodiment of the invention, it will be apparent to one skilled in the art to which the invention pertains that various changes and modifications may be made therein without departing from the spirit of the invention or the scope of the appended claims.

I claim:

1. In a gas turbine engine, a combustion chamber housing assembly comprising a combustor structure subject to combustion gas temperature and having an annular central opening, an annular swirl vane structure covering said opening and subject to inlet air temperature, and means removably attaching said swirl vane structure to said combustor structure, said means comprising a plurality of circumferentially spaced substantially U-shaped clip elements, each of said clip elements facing radially outwardly and having one leg secured near the outer edge of said swirl vane structure, the edge of said combustor opening adapted to be engaged between the legs of said clip element and radially spaced from the base thereof to permit radial thermal expansion and contraction of said combustor structure relative to said swirl vane structure, the edge of said combustor central opening having radially extending notches circumferentially spaced equally with the circumferential spacing of said clip elements to permit assembly of said structures upon passing one leg of each clip through a notch and relatively rotating said structures to engage the clips with the combustor opening edge portions intermediate said notches, and a retainer means inserted between the combustor opening edge and the last-mentioned leg of each clip, said retainer means covering said notches to prevent removal of the clip elements therethrough, said retainer means comprising a ring element having an inner peripheral edge substantially of the diameter of said combustor central opening, and means securing said ring element against rotation relative to said combustor structure.

2. In a gas turbine engine, a combustion chamber housing assembly comprising a combustor structure subject to combustion gas temperature and having an annular central opening, an annular swirl vane structure covering said opening and subject to inlet air temperature, and means removably attaching said swirl vane structure to said combustor structure, said means comprising a plurality of circumferentially spaced substantially U-shaped clip elements, each of said clip elements facing radially outwardly and having one leg secured near the outer edge of said swirl vane structure, the edge of said combustor opening adapted to be engaged between the legs of said clip element and radially spaced from the base thereof to permit radial thermal expansion and contraction of said combustor structure relative to said swirl vane structure, the edge of said combustor central opening having radially extending notches circumferentially spaced equally with the circumferential spacing of said clip element to permit assembly of said structures upon passing one leg of each clip through a notch and relatively rotating said structures to engage the clips with the combustor opening edge portions intermediate said notches, and a retainer means inserted between the combustor opening edge and the last-mentioned leg of each clip, said retainer means covering said notches to prevent removal of the clip elements therethrough, said retainer means comprising a ring element having an inner peripheral edge substantially of the diameter of said combustor central opening, and a tab element secured to said ring element and engaged in one of said notches to secure said ring element against rotation relative to said combustor structure.

References Cited in the file of this patent

UNITED STATES PATENTS

| | | |
|---|---|---|
| 1,415,053 | Robertson | May 9, 1922 |
| 2,148,789 | Unger | Feb. 28, 1939 |
| 2,364,512 | Bower | Dec. 5, 1944 |
| 2,801,520 | Highberg | Aug. 6, 1957 |
| 2,856,755 | Szydlowski | Oct. 21, 1958 |

FOREIGN PATENTS

| | | |
|---|---|---|
| 710,353 | Great Britain | June 9, 1954 |